(12) United States Patent
Koppal

(10) Patent No.: US 10,079,970 B2
(45) Date of Patent: Sep. 18, 2018

(54) CONTROLLING IMAGE FOCUS IN REAL-TIME USING GESTURES AND DEPTH SENSOR DATA

(71) Applicant: Texas Instruments Incorporated, Dallas, TX (US)

(72) Inventor: Sanjeev Jagannatha Koppal, Gainesville, FL (US)

(73) Assignee: Texas Instruments Incorporated, Dallas, TX (US)

( * ) Notice: Subject to any disclaimer, the term of this patent is extended or adjusted under 35 U.S.C. 154(b) by 289 days.

(21) Appl. No.: 14/292,900

(22) Filed: May 31, 2014

(65) Prior Publication Data

US 2015/0022649 A1 Jan. 22, 2015

Related U.S. Application Data

(60) Provisional application No. 61/846,808, filed on Jul. 16, 2013.

(51) Int. Cl.
*H04N 5/232* (2006.01)
*G06T 5/00* (2006.01)
*G06T 5/50* (2006.01)

(52) U.S. Cl.
CPC ......... *H04N 5/23212* (2013.01); *G06T 5/002* (2013.01); *G06T 5/50* (2013.01); *H04N 5/23219* (2013.01); *G06T 2200/04* (2013.01); *G06T 2207/10028* (2013.01); *G06T 2207/30201* (2013.01)

(58) Field of Classification Search
CPC ....... G06T 2200/04; G06T 2207/10028; G06T 2207/30201; G06T 5/002; G06T 5/50; H04N 5/23212; H04N 5/23219

USPC ........................................................ 348/77
See application file for complete search history.

(56) References Cited

U.S. PATENT DOCUMENTS

| | | | |
|---|---|---|---|
| 7,227,526 B2* | 6/2007 | Hildreth | G06T 19/006 345/156 |
| 9,007,441 B2* | 4/2015 | Sun | H04N 13/0018 348/47 |
| 9,310,891 B2* | 4/2016 | Rafii | G06F 3/017 |
| 2009/0180771 A1* | 7/2009 | Liu | G03B 7/097 396/61 |

(Continued)

OTHER PUBLICATIONS

Richard Szeliski, "Image Alignment and Stitching: A Tutorial", Foundations and Trends in Computer Graphics and Vision, vol. 2, No. 1, Jan. 2006, Now Publishers Inc, Hanover, MA, pp. 1-104.

(Continued)

*Primary Examiner* — Anner N Holder
(74) *Attorney, Agent, or Firm* — Michelle F. Murray; Charles A. Brill; Frank D. Cimino

(57) ABSTRACT

A method of controlling image focus in a digital imaging system is provided that includes receiving a depth-scene image pair generated by a depth-scene image sensor pair comprised in the digital imaging system, aligning the depth image with the scene image wherein each pixel in the scene image has a corresponding depth in the aligned depth image, detecting a user gesture associated with a focus effect, and blurring, responsive to the user gesture, at least a portion of the scene image according to the focus effect, wherein the blurring is based on depths in the depth image.

20 Claims, 2 Drawing Sheets

(56) References Cited

U.S. PATENT DOCUMENTS

| | | | | |
|---|---|---|---|---|
| 2009/0183125 | A1* | 7/2009 | Magal | G06F 3/017 |
| | | | | 715/863 |
| 2009/0254855 | A1* | 10/2009 | Kretz | G06F 1/1626 |
| | | | | 715/800 |
| 2010/0208038 | A1 | 8/2010 | Kutliroff et al. | |
| 2011/0173204 | A1* | 7/2011 | Murillo | A63F 13/06 |
| | | | | 707/741 |
| 2012/0196679 | A1* | 8/2012 | Newcombe | G06T 7/2046 |
| | | | | 463/36 |
| 2013/0044042 | A1 | 2/2013 | Olsson et al. | |
| 2013/0272581 | A1 | 10/2013 | Moden | |
| 2014/0037135 | A1 | 2/2014 | Gershom Kutliroff et al. | |
| 2014/0123077 | A1 | 5/2014 | Kutliroff et al. | |
| 2014/0129935 | A1* | 5/2014 | Ovadia Nahon | G06F 3/01 |
| | | | | 715/716 |
| 2014/0237432 | A1* | 8/2014 | Geurts | G06F 3/005 |
| | | | | 715/863 |
| 2016/0360116 | A1* | 12/2016 | Penha | G06F 3/0487 |

OTHER PUBLICATIONS

"OPT8130 and OPT8140 3D Time of Flight Analog Output DepthSense Image Sensors", SLAB063, 2013, Texas Instruments, Inc., Dallas, TX, pp. 1-2.

Marc Pollefeys and Luc Van Gool, "Self-Calibration from the Absolute Conic on the Plane at Infinity", Proceedings 7th International Conference on Computer Analysis of Images and Patterns, Sep. 10-12, 1997, Kiel, Germany, pp. 175-182.

"Homography (computer vision)", Wikipedia, pp. 1-4, available at http://en.wikipedia.org/w/index.php?title=Homography_(computer_vision)&oldid=606753452, May 2, 2014.

Larry Li, "Time-of-Flight Camera—An Introduction", Texas Instruments, Inc., Technical White Paper SLOA190B, Jan. 2014, revised May 2014, pp. 1-10.

Fundamental matrix (computer vision), Wikipedia, pp. 1-5, available at http://en.wikipedia.org/w/index.php?title=Fundamental_matrix_(computer_vision)&oldid=599746156, last modified Mar. 15, 2014.

"Camera matrix", Wikipedia, pp. 1-5, available at http://en.wikipedia.org/w/index.php?title=Camera_matrix&oldid=583233158, last modified Nov. 25, 2013.

George Bebis, "Camera Parameters: CS4851685 Computer Vision", University of Nevada Lecture, Reno, Nevada, pp. 1-50, available at http://www.cse.unr.edu/~bebis/CS485/Lectures/CameraParameters.ppt, last visited May 31, 2014.

Harvey Rhody, "Camera Calibration from Multiple Views", Rochester Institute of Technology, Rochester, NY, Mar. 28, 2006, pp. 1-22.

Marcia Bertarini, "Smart glasses: interaction, privacy and social implications", Ubiquitous Computing Seminar FS2014, ETH Zurich, Switzerland, Jan. 4, 2014, pp. 1-38.

Peter Henry et al, "RGB-D Mapping: Using Depth Cameras for Dense 3D Modeling of Indoor Environments", in O. Khatib, et al. (Ed.), Experimental Robotics, The 12th International Symposium on Experimental Robotics: Springer Tracts in Advanced Robotics, vol. 79, 2014, pp. 447-491.

Chris Davies, "MetaPro AR glasses pack Iron Man tech into Aviator style", SlashGear, Dec. 17, 2013, pp. 1-11, available at http://www.slashgear.com/metapro-ar-glasses-pack-iron-man-tech-into-aviator-style-17309096/.

Alex Paul Pentland, "A New Sense for Depth of Field", IEEE Transactions on Pattern Analysis and Machine Intelligence, vol. PAMI-9, No. 4, Jul. 1987, pp. 523-531.

Bill Wong, "Time-Of-Flight 3D Coming to a Device Near You", Electronic Design, vol. 61, Issue 9, Aug. 8, 2013, pp. 72.

Masahiro Watanabe and Shree K. Nayar, "Rational Filters for Passive Depth from Defocus", International Journal of Computer Vision, vol. 27, No. 3, Hingham, MA, May 1, 1998, pp. 203-225.

Christian Richardt et al, "Coherent Spatiotemporal Filtering, Upsampling and Rendering of RGBZ Videos", Computer Graphics Forum, Proceedings of EUROGRAPHICS 2012, vol. 31, No. 2, Cagliari, Italy, May 2012, pp. 247-256.

* cited by examiner

CONTROLLING IMAGE FOCUS IN REAL-TIME USING GESTURES AND DEPTH SENSOR DATA

CROSS-REFERENCE TO RELATED APPLICATIONS

This application claims benefit of U.S. Provisional Patent Application Ser. No. 61/846,808, filed Jul. 16, 2013, which is incorporated by reference herein in its entirety.

BACKGROUND OF THE INVENTION

Field of the Invention

Embodiments of the present invention generally relate to controlling image focus in real-time with gestures and depth sensor data.

Description of the Related Art

High-end professional cameras and SLR (single-lens reflex) cameras can create "depth of field" effects in images in which the foreground, background or other areas of an image are either in focus or out of focus. In such cameras, for a given subject framing and camera position, the depth of field is controlled by the lens aperture diameter, which is usually specified as the f-number, the ratio of lens focal length to aperture diameter. However, most cameras do not have the ability to create depth of field focus effects. For example, most embedded cameras such as cell phone cameras, web cameras, and cameras in wearable devices such as Google glass have a pinhole aperture which does not allow for defocus effects.

SUMMARY

Embodiments of the present invention relate to methods, apparatus, and computer readable media for controlling image focus in real-time with gestures and depth sensor data. In one aspect, a method of controlling image focus in a digital imaging system is provided that includes receiving a depth-scene image pair generated by a depth-scene image sensor pair comprised in the digital imaging system, aligning the depth image with the scene image wherein each pixel in the scene image has a corresponding depth in the aligned depth image, detecting a user gesture associated with a focus effect, and blurring, responsive to the user gesture, at least a portion of the scene image according to the focus effect, wherein the blurring is based on depths in the depth image.

In one aspect, a digital imaging system is provided that includes a depth-scene image sensor pair configured to capture depth-scene image pairs of a scene, means for receiving a depth-scene image pair generated by the depth-scene image sensor pair, means for aligning the depth image with the scene image wherein each pixel in the scene image has a corresponding depth in the aligned depth image, means for detecting a user gesture associated with a focus effect, and means for blurring, responsive to the user gesture, at least a portion of the scene image according to the focus effect, wherein the blurring is based on depths in the depth image.

In one aspect, a non-transitory computer readable medium is provided that stores software instructions that, when executed by at least one processor in a digital imaging system, cause a method of controlling image focus to be performed. The method includes receiving a depth-scene image pair generated by a depth-scene image sensor pair comprised in the digital imaging system, aligning the depth image with the scene image wherein each pixel in the scene image has a corresponding depth in the aligned depth image, detecting a user gesture associated with a focus effect, and blurring, responsive to the user gesture, at least a portion of the scene image according to the focus effect, wherein the blurring is based on depths in the depth image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
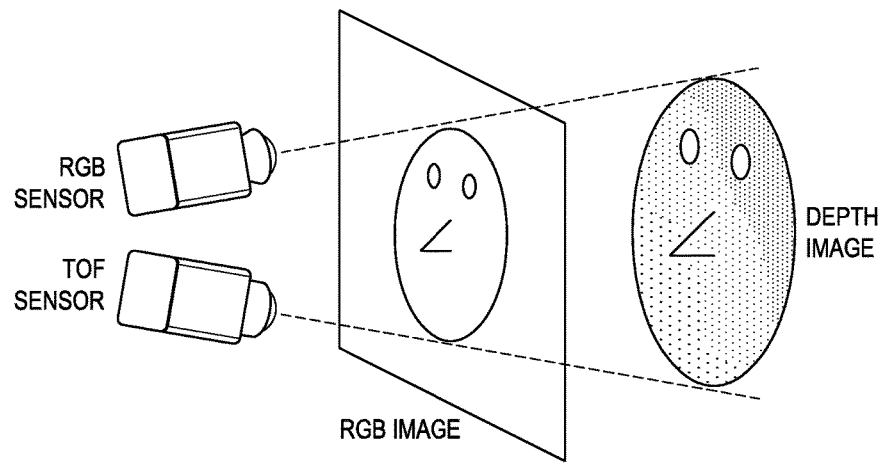
FIG. 1 is a simple example of a red-green-blue (RGB) sensor paired with a TOF sensor

Specific embodiments of the invention will now be described in detail with reference to the accompanying figures. Like elements in the various figures are denoted by like reference numerals for consistency. For simplicity of explanation, embodiments are described herein assuming that in a depth-scene image sensor pair, the scene sensor is a red-green-blue (RGB) sensor and the depth sensor is a time-of-flight (TOF) sensor. One of ordinary skill in the art will understand embodiments in which the scene sensor may be, for example, a grayscale image sensor, a hyperspectral image sensor, or any other type of image sensor configured to provide the color and appearance of a scene and/or the depth sensor may be any suitable depth sensor, such as, for example, a structured light depth sensor.

As previously mentioned, most cameras do not have the ability to create depth of field focus effects in real-time as images are generated. Embodiments of the invention provide low-cost digital imaging systems with gesture activated focus control for generating focus effects such as, for example, depth of field effects, in real-time. In such digital imaging systems, a depth sensor is paired with a scene sensor and, responsive to user gestures, depth data from the depth sensor is used to generate depth effects in images generated by the scene sensor. Consider the simple example of FIG. 1 in which a red-green-blue (RGB) sensor paired with a TOF sensor. The RGB sensor generates RGB images of the scene and the TOF sensor generates depth images of the scene. User gestures associated with focus control may be recognized, for example, in the RGB image stream from the RGB sensor, and responsive to these gestures, the indicated focus effects are applied to RGB images in depth-RGB image pairs using depth information in the depth images.

Figure 2:
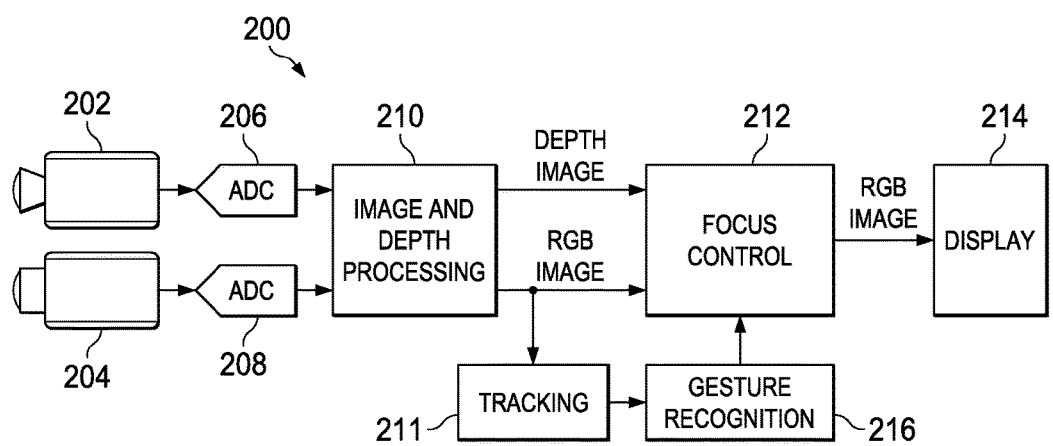
FIG. 2 is a block diagram of an example digital imaging system.

FIG. 2 is a block diagram of an example digital imaging system 200 with a TOF-RGB sensor pair. The digital imaging system 200 may be embedded in a consumer device such as, for example, smart glasses (e.g., Google Glass, EyeTap, Recon Snow, etc.), tablets, smart phones, digital still and video cameras, etc. The digital imaging system 200 includes an RGB imaging component 202, a TOF imaging component 204, two analog to digital (ADC) conversion components 206, 208, an image and depth processing component 210, a tracking component 211, a gesture recognition component 216, a focus control component 212, and a display component 214.

The components of the digital imaging system 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions implementing some or all of the functionality of one or more of the components may be stored in memory (not shown) and executed by one or more of the processors. Some or all of the software instructions may be initially stored in a computer-readable medium such as a compact disc (CD), a diskette, a tape, a file, memory, or any other computer readable storage device and loaded and stored on the digital imaging system 200. In some cases, the software instructions may also be sold in a computer program product, which includes the computer-readable medium and packaging materials for the computer-readable medium. In some cases, the software instructions may be distributed to the digital imaging system 200 via removable computer readable media (e.g., floppy disk, optical disk, flash memory, USB key), via a transmission path from computer readable media on another computer system (e.g., a server), etc The RGB imaging component 202 is an RGB imaging sensor system arranged to capture RGB image signals of a scene and the TOF imaging component 204 is a TOF imaging sensor system arranged to capture TOF signals of scene. The RGB imaging sensor component 106 includes a lens assembly, a lens actuator, an aperture, and a suitable imaging sensor. The TOF imaging component 204 is configured to illuminate the scene with a modulated light source and to observe the reflected light. More specifically, the TOF imaging component 204 includes a lens assembly, a lens actuator, an aperture, an illumination unit arranged to project modulated light, e.g., infrared light, into the scene, and a suitable imaging sensor designed to respond to the same spectrum as the projected light and to convert the photonic energy to electrical current. Each pixel captured by the imaging sensor measures the time taken for the light from the illumination unit to reach surfaces in the scene and return. The digital imaging system 200 includes circuitry for controlling various aspects of the operation of the RGB imaging component 202 and the TOF imaging component 204, such as, for example, exposure time, synchronization of image capture by the two imaging components, etc.

In some embodiments, the RGB imaging component 202 and the TOF imaging component 204 may be arranged vertically such that one component is on top of the other, i.e., the two components have a vertical separation baseline. In some embodiments, the RGB imaging component 202 and the TOF imaging component 204 may be arranged horizontally such that one component is next to the other, i.e., the two components have a horizontal separation baseline.

The analog-to-digital (ADC) conversion components 206, 208 receive analog image signals from the respective imaging components 202, 204 and convert the analog image signals to digital image signals for further processing by the image and depth processing component 210.

The image and depth processing component 210 divides the incoming digital signal(s) into frames of pixels and processes each frame to enhance the image data in the frame. For the RGB frames, the processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. For the TOF frames, the processing performed may include faulty pixel correction, denoising, de-aliasing, frequency tuning and temperature compensation.

The image and depth processing component 104 generates a depth image from the enhanced TOF image data. Any suitable algorithm may be used to generate the depth image from the enhanced image data. In addition, the image and depth processing component 210 aligns the depth image and the RGB image of each RGB-depth image pair. Any suitable alignment algorithm executable in real time may be used to align the images. In some embodiments, the alignment may be performed as described in co-pending U.S. patent application Ser. No. 14/292,897, filed May 31, 2014, which is incorporated by reference herein in its entirety. Examples of other suitable alignment algorithms are described in C. Richardt, et al., "Coherent Spatiotemporal Filtering, Upsampling and Rendering of RGBZ Videos," Computer Graphics Forum, Proceedings of EUROGRAPHICS 2012, Vol. 31, No. 2, Cagliari, Italy, May 2012, pp. 247-256 and P. Henry, et al., "RGB-D Mapping: Using Depth Cameras for Dense 3D Modeling of Indoor Environments," in O. Khatib, et al. (Ed.), *Experimental Robotics: The 12$^{th}$ International Symposium on Experimental Robotics: Springer Tracts in Advanced Robotics*, Vol. 79, 2014, Springer Berlin Heidelberg, pp. 477-497.

The focus control component 212 receives the aligned depth and RGB images, and applies focus effects to the RGB image using depth information from the depth image. The particular focus effect to be applied is selected based on user hand gestures recognized by the gesture recognition component 216. The particular focus effects provided by the focus control component 212 and the association of hand gestures to focus effects are implementation dependent. Examples of focus effects that may be provided by the focus control component 212 responsive to hand gestures are described below in reference to the method of FIG. 3.

The tracking component 211 receives a stream of RGB images from the image and depth processing component 210 and detects and tracks objects in the RGB image stream. In particular, suitable object tracking is performed to provide data needed by the gesture recognition component 216 to recognize hand gestures performed by a user of the digital imaging system 200. Algorithms for tracking objects for hand gesture recognition in RGB video streams are well-known and any suitable tracking algorithm(s) may be used. In some embodiments, the tracking component 211 may also track other objects of interest in the RGB image stream and provide data about the objects to the focus control component 212.

The gesture recognition component 216 receives tracking data from the tracking component 211 and uses the data to determine if a hand gesture has been performed. The particular hand gestures recognized by the gesture recognition component 216 are implementation dependent and may be determined by the particular gestures expected by the focus control component 212. The gesture recognition component 216 provides the focus control component 212 with data regarding any recognized gestures.

The display component 214 displays the RGB images after processing by the focus control component 212. As previously mentioned, the focus control component 212 may apply focus effects to the original RGB images responsive to hand gestures recognized in the RGB image stream. The display component 214 may be any suitable display device, e.g., a liquid-crystal (LCD) display device, a light-emitting diode (LED) display device, a heads-up (HUD) display device, a Retina Display such as those used in some Apple products, a virtual retinal display (VRD), etc.

While not specifically shown, the digital imaging system 200 or the consumer device in which the digital imaging system 200 is embedded may include user control functionality, e.g., buttons, voice commands, etc., to allow a user to capture and store the RGB images once the desired focal effect is applied by the focus control component 212. The RGB images may be captured as individual still photographs or as a video stream.

Figure 3:
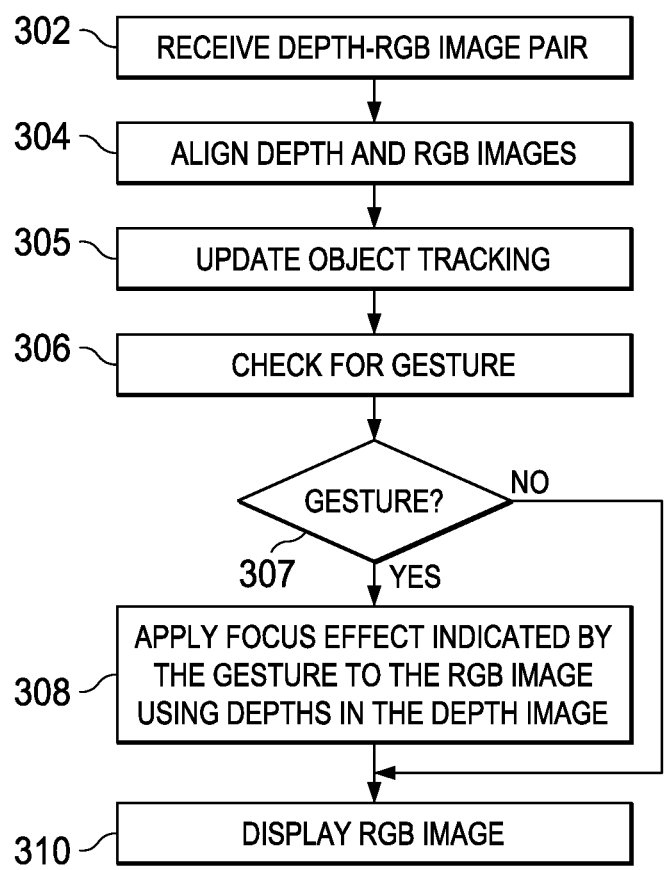
FIG. 3 is a flow diagram of a method.

FIG. 3 is a flow diagram of a method for controlling image focus in real-time using gestures and depth sensor data that may be performed, for example, by the digital imaging system 200 of FIG. 2. This method is performed on depth-RGB image pairs generated by a TOF-RGB image sensor pair such as that of FIG. 2. The method assumes that image processing such as that previously described has been performed on image pairs generated by the sensor pair to enhance the RGB image and to enhance the TOF image and generate the depth image.

As shown in FIG. 3, a depth-RGB image pair is received 302 and the depth and RGB image are aligned 304. Any suitable alignment algorithm executable in real time may be used to align the images. Examples of suitable algorithms that may be used are previously described herein.

Object tracking is then updated 305 based on the RGB image. Suitable object tracking is performed to provide data needed to recognize any hand gestures performed by a user. Algorithms for tracking objects for hand gesture recognition in RGB video streams are well-known and any suitable tracking algorithm(s) may be used. In some embodiments, the object tracking may also track other objects of interest in the RGB image stream.

Gesture recognition is then performed using tracking data from the object tracking to check 307 for a hand gesture by the user. The particular hand gestures recognized are implementation dependent and may be determined by the particular gestures used for focus control. If a gesture is not recognized 307, the RGB image is displayed. If a focus effect has been previously requested via a hand gesture and not turned off, that focus effect is applied to the RGB image prior to displaying the RGB image. If a gesture is recognized 307, then the focus effect indicated by the gesture is applied 308 to the RGB image using depth information from the depth image, and the resulting RGB image is displayed 310. Although not specifically shown, the user may also cause the RGB image to be captured and stored, either as a still photograph or as part of a video stream.

The application of a focus effect to an RGB image may be performed by determining and applying a blur kernel to areas of the RGB image to be blurred to achieve the particular focus effect. For example, if the focus effect indicated by the recognized gesture is to blur all parts of a scene with a depth greater than some user specified or pre-determined depth, then the blur kernel is determined for all pixels in the RGB image having a depth in the depth map that is greater than the specified depth.

The thin lens blur model for frontal-parallel planes, which is the dominant model in photography today, may be used to find the blur kernel. For this model, the amount of blur at any pixel in the RGB pixel, i.e., the blur kernel, has a well-known relationship to the depth of that pixel. This relationship is described, for example, in A. Pentland, "A New Sense for Depth of Field," IEEE Transactions on Pattern Analysis and Machine Intelligence, Vol. 9, Issue 4, April 1987, pp. 523-531, and M. Watanabe and S. Nayar, "Rational Filters for Passive Depth from Defocus," International Journal of Computer Vision, Vol. 27, No. 3, May 1998, pp. 203-225. Usually the pixel depth is unknown. However, given the depth image that is aligned with the RGB image, the depth of each pixel is known. Thus, this model can be used to find the blur kernel or amount of blur at each pixel. Algorithms for application of a blur kernel to an RGB image are well-known and any suitable algorithm may be used.

The particular focus effects available and the association of hand gestures to focus effects is implementation dependent. In one or more embodiments, a set of hand gestures is selected and each is assigned to some task related to one or more focus effect. For example, in some embodiments, a hand gesture such as a wave may be associated with controlling a simple depth of field focus effect. In such an embodiment, when the gesture is first recognized, all pixels in the RGB image having a depth greater than some pre-determined depth are blurred such that the closer part of the scene (the foreground) is in focus and the remainder of the scene is blurred. When the gesture is recognized again, the depth of field effect is switched by blurring all pixels in the RGB image having a depth less than or equal to the pre-determined depth such that the closer part of the scene is blurred and the remainder of the scene (the background) is in focus.

In another example, in some embodiments, a hand gesture such as a first with upraised thumb may be associated with initiating a view camera focus effect, i.e., a tilt-shift focus effect. In such an embodiment, when the gesture is recognized, a thin lens blur is applied to all areas in the RGB image outside of a default target depth, plus or minus a default interval of depths around the target depth. The user may then swipe a hand in the air to move the plane backward or forward, with appropriate blur applied to the displayed image, until the desired location is reached. Finally, the user may then move the thumb and forefinger of a hand closer or further away to change the depth of field.

In another example, in some embodiments, a hand gesture such as pointing a finger may be associated with controlling a depth of field focus effect based on an object in the scene indicated by the gesture. In such an embodiment, when the gesture is recognized, tracking information is used to locate the indicated object in the RGB image and the depth image. All pixels in the RGB image other than those of the indicated object are then blurred using depth information from the depth image.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming that the object tracking and gesture recognition are performed on an RGB image stream. Performing object tracking and gesture recognition on a depth image stream are well-known and one of ordinary skill will understand embodiments in which the object tracking and gesture recognition are performed on the depth image stream instead of the RGB image stream.

In another example, embodiments have been described herein assuming that hand gestures are used for focus control. One of ordinary skill in the art will understand embodiments in which other natural user interfaces may be used for focus control. For example, an imaging sensor aimed at the user's face may used to detect eye motions that can be associated with various focus effects.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of controlling image focus in a digital imaging system, the method comprising:
   receiving, by at least one processor of the digital imaging system, a depth-scene image pair generated by a depth-scene image sensor pair included in the digital imaging system, the depth-scene image sensor pair including a depth sensor and a scene sensor, the depth-scene image pair including a depth image and a scene image;
   aligning, by the at least one processor, the depth image with the scene image, wherein each pixel in the scene image has a corresponding depth in the aligned depth image;
   detecting, by the at least one processor, a user gesture in a scene image stream generated by the scene sensor;
   selecting, by the at least one processor, a focus effect to be either a depth of field focus effect or a view camera focus effect, in response to the user gesture; and
   applying, by the at least one processor, the selected focus effect to at least a portion of the scene image based on depths in the depth image.

2. The method of claim 1, wherein the user gesture is a hand gesture.

3. The method of claim 1, wherein the depth sensor is a time-of-flight (TOF) sensor.

4. The method of claim 3, wherein detecting the user gesture comprises detecting the user gesture in a depth image stream generated by the TOF sensor.

5. The method of claim 1, wherein the scene sensor is a red-green-blue (RGB) image sensor.

6. The method of claim 1, wherein the selected focus effect is the view camera focus effect.

7. The method of claim 1, wherein the selected focus effect is the depth of field focus effect.

8. The method of claim 1, further comprising:
   displaying the scene image after applying the selected focus effect.

9. A digital imaging system, comprising:
   a depth-scene image sensor pair configured to capture depth-scene image pairs of a scene, the depth-scene image sensor pair including a depth sensor and a scene sensor;
   at least one processor; and
   a non-transitory computer readable storage medium storing a program for execution by the at least one processor, the program including instructions for:
      receiving a depth-scene image pair generated by the depth-scene image sensor pair, the depth-scene image pair including a depth image and a scene image;
      aligning the depth image with the scene image, wherein each pixel in the scene image has a corresponding depth in the aligned depth image;
      detecting a user gesture in a scene image stream generated by the scene sensor;
      selecting a focus effect to be either a depth of field focus effect or a view camera focus effect, in response to the user gesture; and
      applying the selected focus effect to at least a portion of the scene image based on depths in the depth image.

10. The digital imaging system of claim 9, wherein the user gesture is a hand gesture.

11. The digital imaging system of claim 9, wherein the depth sensor is a time-of-flight (TOF) sensor.

12. The digital imaging system of claim 9, wherein detecting [ [a]] the user gesture comprises detecting the user gesture in a depth image stream generated by the TOF sensor.

13. The digital imaging system of claim 9, wherein the scene sensor is a red-green-blue (RGB) image sensor.

14. The digital imaging system of claim 9, wherein the selected focus effect is the view camera focus effect.

15. The digital imaging system of claim 9, wherein the selected focus effect is the depth of field focus effect.

16. The digital imaging system of claim 9, wherein the instructions further comprise instructions for:
   displaying the scene image after applying the selected focus effect.

17. A non-transitory computer readable storage medium storing a program for execution by at least one processor in a digital imaging system, the program including instructions to:
   receive a depth-scene image pair generated by a depth-scene image sensor pair included in the digital imaging system, the depth-scene image sensor pair including a depth sensor and a scene sensor, the depth-scene image pair including a depth image and a scene image;
   align the depth image with the scene image wherein each pixel in the scene image has a corresponding depth in the aligned depth image;
   detect a user gesture in a scene image stream generated by the scene sensor;
   select a focus effect to be either a depth of field focus effect or a view camera focus effect, in response to the user gesture; and
   apply the selected focus effect to at least a portion of the scene image based on depths in the depth image.

18. The computer readable storage medium of claim 17, wherein the user gesture is a hand gesture.

19. The method of claim 7, wherein applying the selected focus effect comprises:
   detecting an object in the scene image;
   determining a depth of the object; and
   blurring portions of the scene image having depths different than the depth of the object.

20. The method of claim 7, wherein applying the selected focus effect comprises adjusting a depth of focus based on the user gesture.

* * * * *